United States Patent Office 3,154,561
Patented Oct. 27, 1964

3,154,561
ORGANIC SULFIDE DERIVATIVES OF DECABORANE
Earl Leonard Muetterties, Chadds Ford, Pa., assignor to E. I. du Pont de Nemours and Company, Wilmington, Del., a corporation of Delaware
No Drawing. Filed July 25, 1958, Ser. No. 750,862
8 Claims. (Cl. 260—327)

This invention relates to, and has for its object the provision of, new derivatives of decaborane. More particularly, it relates to decaborane derivatives containing sulfur and to their preparation.

The compounds of this invention are the reaction products of decaborane with organic sulfides. One group of the products of this invention comprises products having the formula $B_{10}H_{12} \cdot 2RSR'$, which result from the reaction of one mole of decaborane with two moles of an organic sulfide having the formula RSR', wherein R and R' are monovalent hydrocarbon radicals, i.e., alkyl, aryl, cyclo-alkyl, alkenyl, cycloalkenyl, and wherein R and R' taken together form a divalent hydrocarbon radical, i.e., an alkylene radical. The R and R' groups can be the same or different, except that only one of them can be aryl.

Another group of the decaborane/organic sulfide reaction products of this invention comprises the reaction products of decaborane with two moles of an organic sulfide of the formula RSR''SR', wherein R and R' have the meaning given above and R'' is an alkylene or arylene radical with the proviso that the groups R and R' must be other than aryl or alkylene when R'' is arylene. These latter products have the formula $B_{10}H_{12} \cdot 2RSR''SR'$, wherein R, R' and R'' have the above meanings.

The decaborane/organic sulfide reaction products are prepared by contacting an organic sulfide of the formula RSR' or RSR''SR' (where R, R' and R'' have the meanings defined hereinbefore) with decaborane at a temperature between 0° and 150° C. until approximately one mole of hydrogen is evolved.

Since the starting sulfides which are most readily available are those in which R and R' are alkyl or aryl or, taken together, are alkylene groups, having up to 8 carbon atoms, and the R'' groups are alkylene groups of up to 6 carbons, the decaborane/organic sulfide reaction products containing these specific R, R' and R'' groups form a preferred group of the products of this invention.

With liquid sulfides an excess of the organic sulfide is conveniently used as a solvent for the reaction. For this purpose, amounts of organic sulfide ranging up to 10–20 times the stoichiometric amounts, as indicated by the following equations, required to form the products of this invention can be used.

$B_{10}H_{14} + 2RSR' \rightarrow B_{10}H_{12} \cdot 2RSR' + H_2$
$B_{10}H_{14} + 2RSR''SR' \rightarrow B_{10}H_{12} \cdot 2RSR''SR' + H_2$ The excess liquid organic sulfide remaining at the end of the reaction can be removed by distillation. Instead of using an excess of organic sulfide as reaction medium, any inert solvent can be employed for this purpose. This is preferred when solid sulfides are used. Ethers, e.g., diethyl ether, dibutyl ether, and dioxane, are especially suitable solvents for use in the process of this invention.

As indicated above, the reaction between the decaborane and the organic sulfide can be carried out at temperatures between about 0° and 150° C. Preferably a reaction temperature between about 25° C. and a temperature at least 15° below the melting point of the reaction product obtained is employed. At temperatures below 0° C. the reaction takes place at an impractically slow rate, while at temperatures near the melting point of the reaction products obtained, discoloration of the decaborane/organic sulfide reaction product takes place.

The reaction pressure is not critical. Pressures ranging from reduced pressure, i.e., less than atmospheric, up to superatmospheric pressures can be used. It is very convenient to carry out the reaction under autogenous pressure.

The reaction between the decaborane and the organic sulfide is carried out until approximately one mole of hydrogen is liberated for each mole of decaborane employed. The actual time required for the reaction to be completed depends on the particular sulfide and the particular reaction temperature being employed. Reaction times of several days, e.g., 2–14 days, are usually required when the reaction is carried out at room temperature with sulfides such as methyl or propyl sulfide. However, when the reaction is carried out at elevated temperatures, e.g., at 100° C., the reaction is completed in several hours, e.g., 4–12 hours, or less.

The decaborane and the organic sulfides used in the process of this invention can be the grades of these materials available commercially. It is preferred, however, to use materials of the highest purity available since they give better yields of the desired products.

The products and process of this invention are illustrated in further detail in the following examples in which the proportions of ingredients are expressed in parts by weight unless otherwise noted.

EXAMPLE I

A reaction vessel having capacity of about 365 parts of water is charged with 0.79 part (6.5 millimoles) of decaborane, cooled in liquid nitrogen, and then evacuated to a pressure of 10 microns of mercury. Approximately 21 parts of methyl sulfide is condensed onto the decaborane in the reaction vessel. The reaction vessel is closed, and then allowed to warm to room temperature and stand for 4 days. During this time, 6.6 millimoles of hydrogen is evolved. The reaction vessel is then opened and excess methyl sulfide is removed by distillation, leaving a practically quantitative yield of white solid residue of $B_{10}H_{12} \cdot 2(CH_3)_2S$ After recrystallization from ethyl acetate, this decaborane/methyl sulfide product melts at 122–124° C. (turns yellow at 117° C.). It is insoluble in petroleum ether but soluble in benzene, tetrahydrofuran and acetone. $B_{10}H_{12} \cdot 2(CH_3)_2S$ rapidly reduces silver nitrate to silver in alcohol solution.

*Analysis.*—Calc'd for $B_{10}C_4H_{24}S_2$: B, 44.26%; C, 19.67%; H, 9.84%; mol. wt., 244. Found: B, 43.67%; C, 21.17%; H, 10.00%; mol. wt., 220, 213.

When the methyl sulfide reactant of Example I is replaced with n-butyl sulfide and reacted with decaborane as described in Example I with the exception that a reaction time of 14 days is used, approximately the theoretical amount of hydrogen is liberated and a solution containing the decaborane/n-butyl sulfide reaction product is obtained.

EXAMPLE II

A reaction vessel having a capacity of 200 parts of water is charged with 2.0 parts of decaborane and 40 parts of n-propyl sulfide. The reaction vessel is protected from atmospheric moisture by means of a drying tube and the solution is allowed to stand at room temperature for 13 days. At the end of this time the remaining propyl sulfide is removed by vacuum distillation leaving a practically quantiative yield of $B_{10}H_{12} \cdot 2(CH_3CH_2CH_2)_2S$ This is obtained as a light yellow solid, M.P. 83–87°

C., which is soluble in benzene, ethyl acetate and acetone, but is insoluble in petroleum ether.

*Analysis.*—Calc'd for $B_{10}C_{12}H_{40}S_2$: B, 30.33%; C, 40.39%; H, 11.30%. Found: B, 30.30%, 30.15%; C, 37.31%, 37.28%; H, 10.55%, 10.42%.

EXAMPLE III

Following the procedure described in Example I, approximately 25 parts of tetramethylene sulfide,

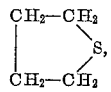

is condensed onto 1.05 parts (8.6 millimoles) or decaborane at liquid nitrogen temperature in an evacuated system. After the reaction system is warmed to room temperature it is allowed to stand for 5 days. During this period approximately one equivalent of hydrogen is evolved and crystals separate from the solution. The excess tetramethylene sulfide is removed by distillation and the residual crystals are rinsed with ethyl acetate. These crystals of the compound $B_{10}H_{12} \cdot 2(CH_2)_4S$ are formed in a practically quantitative yield and have a M.P. of 136–137° C. (turning yellow at 120° C.). This compound reduces silver nitrate to silver in alcohol solution.

*Analysis.*—Calc'd for $B_{10}C_8H_{28}S_2$: B, 36.48%; C, 32.39%; H, 9.52%; mol. wt., 297. Found: B, 35.12%, 34.97%; C, 32.53%, 32.62%; H, 9.57%, 9.41%; mol. wt. 301, 328.

EXAMPLE IV

A "Hastelloy" pressure vessel having a capacity of 100 parts of water is evacuated and charged with 2.1 parts (17.7 millimoles) of 1,4-dithiane, 2.07 parts (17.0 millimoles) of decaborane and 26 parts of dioxane. The vessel is heated at 90° C. for 8 hours during which time 11.1 millimoles of hydrogen is formed. This is removed and the vessel is reheated to 90° for an additional 8 hours. Another 2.3 millimoles of hydrogen is formed and removed. Filtration of the cooled reaction mixture gives 2.3 parts of a light yellow solid. This solid is washed with benzene and petroleum ether and vacuum-dried. The compound melts at 186–187° C. and has the composition

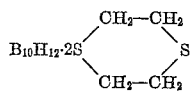

*Analysis.*—Calc'd for $B_{10}C_8H_{28}S_4$: B, 29.99%; C, 26.60%; H, 7.82%. Found: B, 29.54%, 30.40%; C, 26.24%, 25.98%; H, 7.81%, 8.16%.

EXAMPLE V

A glass reaction vessel having a capacity of about 365 parts of water is charged with 1.0 part (8.2 millimoles) of decaborane and 15.0 parts of methyl p-tolyl sulfide and evacuated to the vapor pressure of the solution. It is then heated to a temperature of 120–125° C. for 3 hours during which time 8.9 millimoles of hydrogen is evolved.

The examples have illustrated the products and process of this invention by specific reference to the reaction of certain organic sulfides with decaborane. However, any organic sulfide of the formulas RSR′ and RSR″ SR′, wherein R and R′ are the same or different monovalent hydrocarbon radicals, e.g., alkyl, aryl, cycloalkyl, alkenyl, or cycloalkenyl and when taken together is a divalent hydrocarbon radical, i.e., an alkylene radical, and R″ is a divalent hydrocarbon radical, e.g., alkylene and arylene with the proviso that the groups R and R′ must be other than aryl or alkylene when R″ is arylene can be used.

When the specific organic sulfides listed in the following Table I are reacted with decaborane under the conditions described in the examples, the reaction products listed in the second column of the table are formed.

*Table I*

| Sulfide Reactant | Reaction Product |
| --- | --- |
| Ethyl sulfide | $B_{10}H_{12} \cdot 2(C_2H_5)_2S$ |
| n-Octyl sulfide | $B_{10}H_{12} \cdot 2(n\text{-}C_8H_{17})_2S$ |
| Cyclohexyl sulfide | $B_{10}H_{12} \cdot 2(C_6H_{11})_2S$ |
| Cyclohexenyl sulfide | $B_{10}H_{12} \cdot 2(C_6H_9)_2S$ |
| Vinyl sulfide | $B_{10}H_{12} \cdot 2(C_2H_3)_2S$ |
| Allyl sulfide | $B_{10}H_{12} \cdot 2(C_3H_5)_2S$ |
| Allyl benzyl sulfide | $B_{10}H_{12} \cdot 2(C_3H_5SCH_2C_6H_5)$ |
| 1,3-Bis(methylmercapto)-benzene | $B_{10}H_{12} \cdot 2HC\begin{array}{c}SCH_3\\ \\C=C\\ \\ \end{array}C{-}SCH_3$ |

The decaborane/sulfide reaction products of this invention are useful in various applications. They are effective reducing agents, e.g., silver nitrate is reduced to silver by treatment with the decaborane/methyl sulfide reaction products listed above. These reductions proceed rapidly at 25° C. in ethanolic solution. These reducing agents will also reduce nickel salts to elemental nickel.

The decaborane/sulfide reaction products of this invention are also useful as curing agents for natural or synthetic rubber. For instance, at 1% concentration, the compound $B_{10}H_{12} \cdot 2(CH_3)_2S$ cures natural rubber stock at 140° C.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for preparing decaborane/organic sulfide reaction products which comprises reacting an organic sulfide with decaborane at a temperature of from 0 to 150° C. until the evolution of about an equal molar quantity of hydrogen based on decaborane, said organic sulfide being represented by a formula selected from the group consisting of R—S—R′ and R—S—R″—S—R′ wherein R and R′ taken separately represent monovalent hydrocarbon groups of the class consisting of alkyl, aryl, cycloalkyl, alkenyl, and cycloalkenyl of which only one R and R′ group can be aryl, R and R′ taken together represent an alkylene radical, and R″ represents a divalent hydrocarbon radical which is arylene when R and R′ represent radicals other than aryl and alkylene and which is otherwise alkylene.

2. The decaborane/organic sulfide adducts represented by the formula selected from the group consisting of $B_{10}H_{12} \cdot 2R$—S—R′ and $B_{10}H_{12} \cdot 2R$—S—R″—S—R′ wherein R and R′ taken separately represent monovalent hydrocarbon groups of the class consisting of alkyl, aryl, cycloalkyl, alkenyl, and cycloalkenyl of which only one R and R′ group can be aryl, R and R′ taken together represent an alkylene radical, and R″ represents a divalent hydrocarbon radical which is arylene when R and R′ represent radicals other than aryl and alkylene and which is otherwise alkylene.

3. The compound having the formula

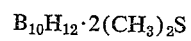

4. The compound having the formula

5. The compound having the formula

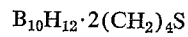

6. The compound having the formula

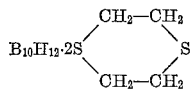

7. $B_{10}H_{12}[(RR')S]_2$ wherein R and R' are each lower alkyl radicals.

8. A process for the preparation of a solid reaction product of decaborane and a dialkyl sulfide which comprises reacting decaborane and a dialkyl sulfide of the class R—S—R' wherein R and R' are lower alkyl radicals and recovering the solid reaction product from the reaction mixture.

References Cited in the file of this patent

UNITED STATES PATENTS 3,092,664     Clark et al. _____ June 4, 1963

OTHER REFERENCES

Emeleus et al.: Modern Aspects of Inorganic Chem. (1952), page 275.

Stone: Quarterly Reviews (London), vol. 9, No. 2 (1955), pp. 174, 175 and 195.

Beachell et al.: J.A.C.S., vol. 80, No. 12, June 20, 1958, pp. 2939–2942.